Oct. 25, 1927.

M. L. WILLIAMS  
BORING AND GRINDING TOOL  
Original Filed April 23, 1921    6 Sheets-Sheet 1

1,646,892

Witness,  
J. B. Mann

Inventor,  
Martin L. Williams.  
By Frank L. Belknap. Atty.

Oct. 25, 1927.  
M. L. WILLIAMS  
1,646,892  
BORING AND GRINDING TOOL  
Original Filed April 23, 1921  6 Sheets-Sheet 4

Witness  
Inventor,  
Martin L. Williams  
By Frank L. Belknap. Atty.

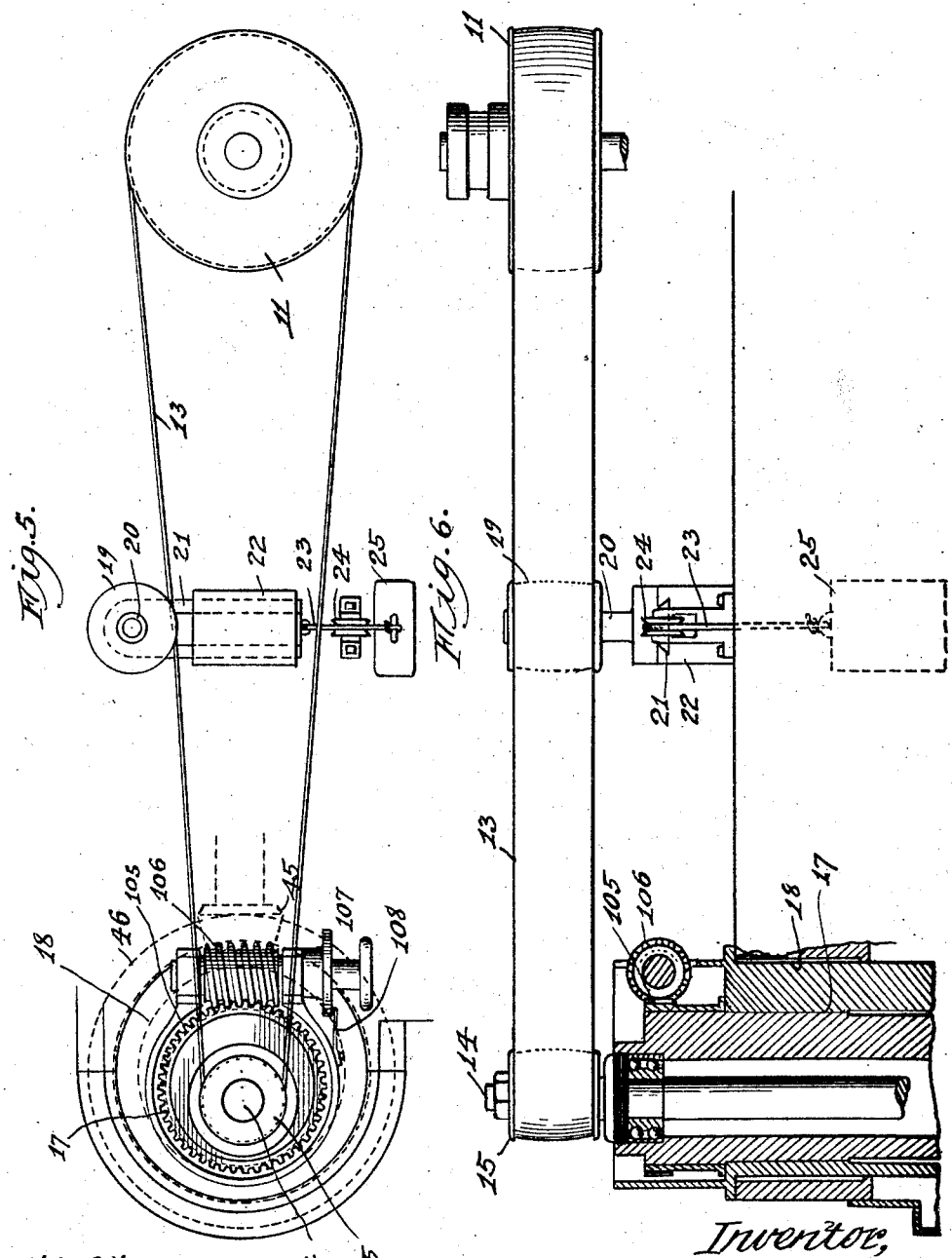

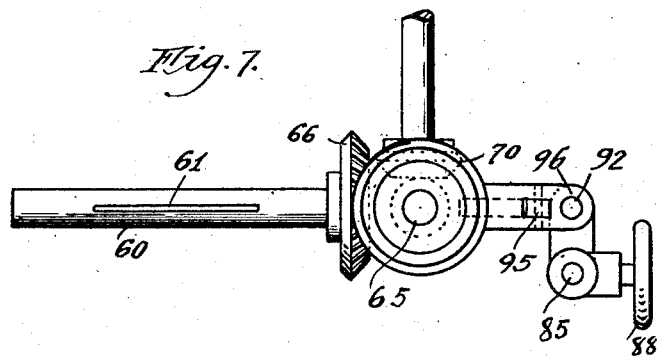
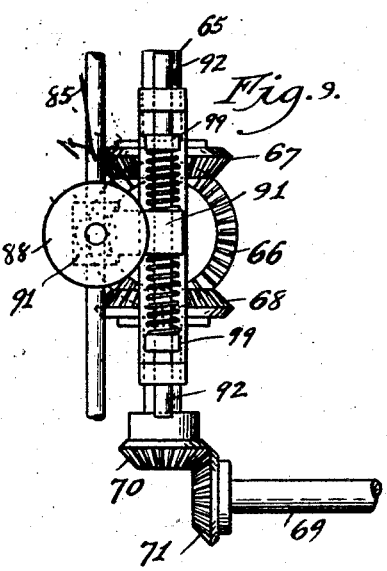
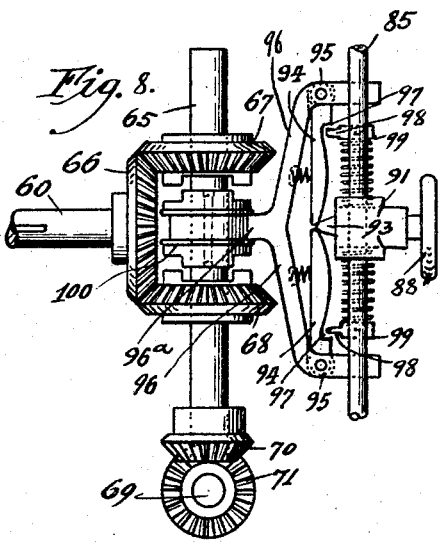
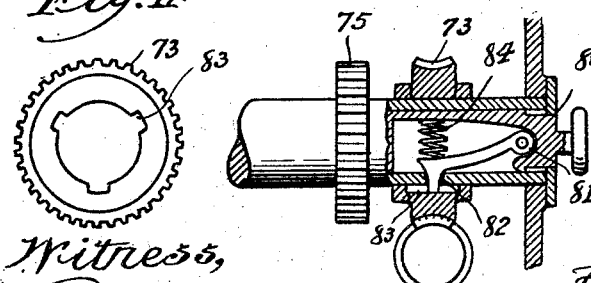

Patented Oct. 25, 1927.

1,646,892

UNITED STATES PATENT OFFICE.

MARTIN L. WILLIAMS, OF MISHAWAKA, INDIANA.

BORING AND GRINDING TOOL.

Application filed April 23, 1921, Serial No. 463,844. Renewed March 21, 1927.

This invention relates to improvements in boring and grinding tools and refers more particularly to a grinding tool adapted for grinding internal combustion engine cylinders and the like.

Among the salient objects of the invention are to provide a tool comprising a frame or press upon which is mounted a rotating arbor and the cutting and grinding tool adapted to be rotated by the arbor to perform their cutting or grinding functions; to provide a machine or tool having a rotating arbor upon which boring or grinding mechanisms are mounted, said arbor being adjustable to accurately cut or grind internal cylindrical surfaces; to provide a machine in which a greater portion of the working parts are mounted in the rotatable and travelling head and operate therewith as a unitary structure; to provide in connection with this travelling head an arbor having a double eccentric arrangement whereby the amount of material cut may be micrometrically set while the head travels automatically through a vertical reciprocation; to provide a machine in which the travelling head is sufficiently counter-balanced and adapted to reciprocate on a double rack arrangement whereby the reciprocation of the head is accurate, smooth and practically without friction; to provide a machine in which the grinding and cutting tools are operated through separate drives and one in which substantially the entire operation of the machine is practically automatic after the initial setting has been made.

In the drawings:

Fig. 5 is a detail of the eccentric sleeves in the rotating head and pulley drive for the grinding mechanism.

Fig. 6 is an elevational view, partly in section, of the mechanism shown in Fig. 5.

Fig. 7 is a fragmentary detail of a portion of the change speed mechanism in plan elevation.

Fig. 8 is a fragmentary side elevational view of that portion of the machine shown in Fig. 7.

Fig. 9 is a front view of that portion of the machine shown in Fig. 8.

Fig. 10 is a detail of the automatic stop mechanism.

Fig. 11 is a detail of the worm gear shown in Fig. 10.

Figure 4:
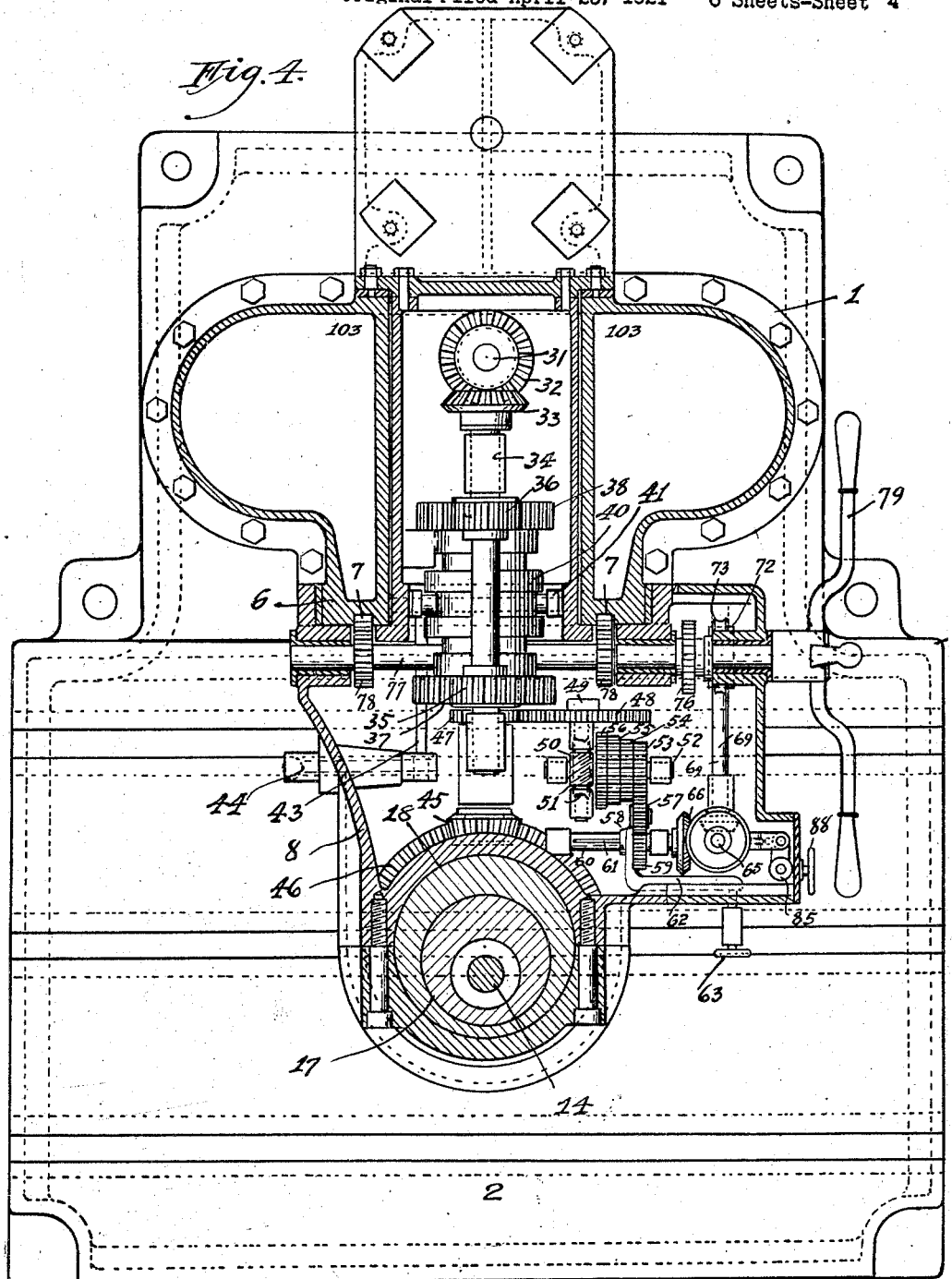
Fig. 4 is a sectional view taken along the line 4—4 of Fig. 1, looking in the direction of the arrows.

Referring more in detail to the drawings, adjacent the upright frame 1 is bolted the table 2, upon which the work is set when it is to be machined or ground by the cutting members 3 mounted upon the arbor 4. Upon the front of the upright frames are connected by upper and lower web members 5 the machine ways 6, upon which are positioned the racks 7. The detailed form of the ways is shown more particularly in Fig. 4, in cross section attention being directed to the fact that the ways are not of the common type of dovetail way usually employed in drill press structure but are of a character that the head 8 in its reciprocation will slide easily up and down their vertical machined surface. The reciprocation of this head is produced by power drive, the details of which will be hereinafter explained. At the rear of the upright frame and mounted on the head is a motor 9 whose shaft 10 has upper drive from the pulley 11 and a lower drive from the pulley 12, both mounted upon the shaft 10. The upper drive is that which produces the rotation of the grinding wheel while the drive from the lower pulley operates the machining tools which are mounted on the arbor. Also from the lower drive is taken off the power for reciprocating the head.

Describing first the drive to the grinding wheel, over the pulley 11 runs a belt 13 which drives the vertical shaft 14 mounted centrally within the sleeve 17 by means of a pulley 15. The grinding wheel is mounted on the lower extremity of this vertical shaft as shown at 16. Two eccentric sleeves 17 and 18 within the reciprocating head furnish a means for accurately setting the proper grinding or machining cut upon the tool used on the arbor. Details of this setting will be hereinafter described fully and it will suffice to say that the setting of the eccentrics produces an eccentric rotation of the vertical shaft 14. In order to keep a constant drive with the eccentric motion of the vertical shaft, it is necessary to interpose an idler pulley 19 which is mounted in a vertical position of a shaft 20 which is fixed to a slidable block 21 adapted to move horizontally along the ways 22, which are mounted on the top of the frame. There is a dovetail connection between the block 21 and the way 22 to guide the slidable block properly. To the slide block 21 is fastened a cable 23 which runs over a sheave 24 mounted on the top of the frame. To this cable is fastened a weight 25 which hangs in one of the central wells produced by the upright frames, its weight keeping the idler pulley 19 in constant contact with the belt and producing a uniform driving tension thereon. When it is desired to disconnect the grinding wheel drive, the pulley 11 may be released from driving connection with the shaft by means of the clutch 26 operated by the hand lever 27 through the bell crank 28.

Figure 2:
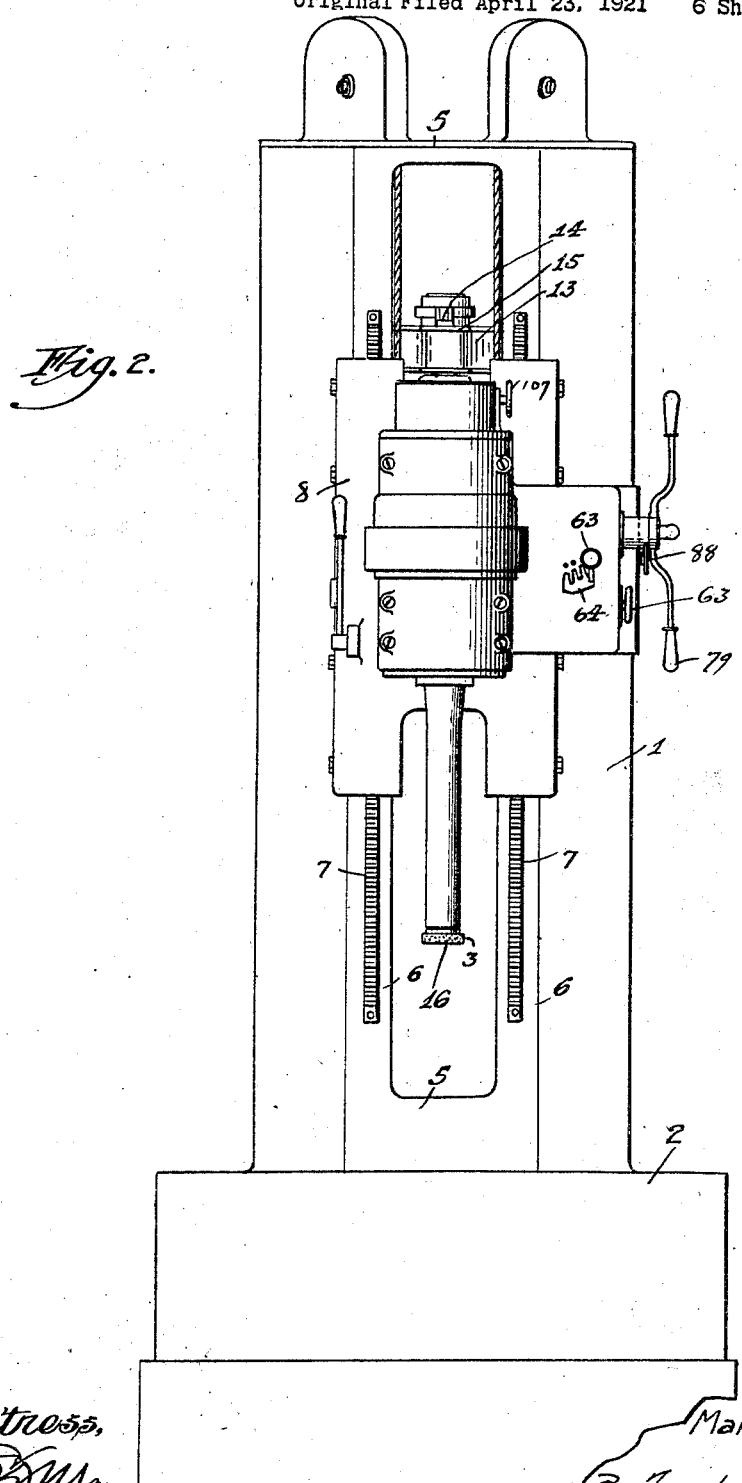
Fig. 2 is a front elevational view of the machine.
Figure 3:
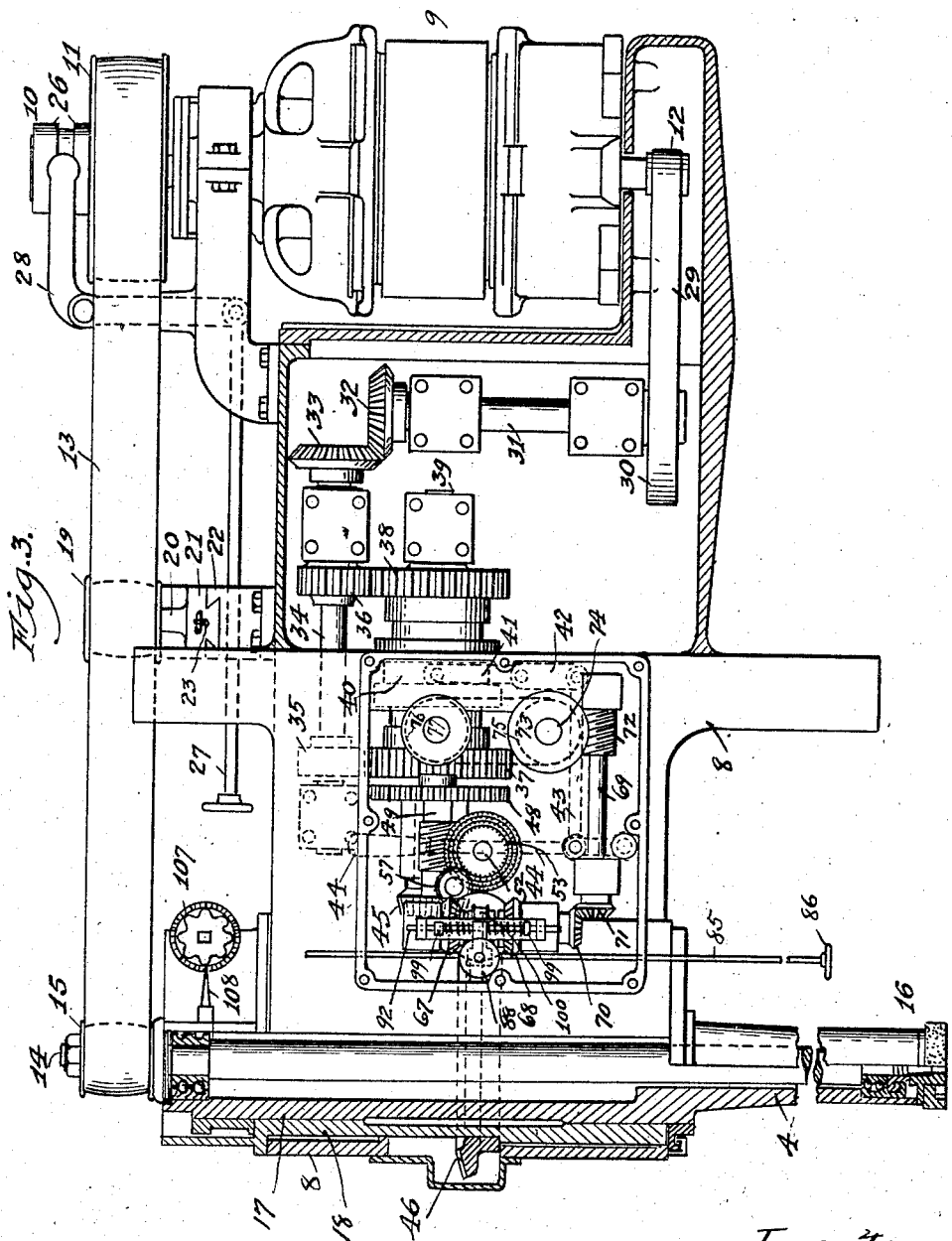
Fig. 3 is a side elevation of the upper portion of the machine with parts broken away to show the interior mechanism.

Describing now the drive used when a cutting tool is mounted on the arbor and when the grinding drive is disconnected by means of the clutch mechanism explained, this drive is taken from the lower extremity of the shaft through the pulley 12, the belt 29 which drives the pulley 30 being mounted on a shaft 31. On the opposite end of the shaft 31 is a bevel gear 32, meshing with a corresponding bevel gear 33 on a shaft 34 positioned at right angles to the shaft 31 and driven thereby. On the shaft 34 are pinions 35 and 36 meshing with gears 37 and 38 respectively, the latter gears being mounted on a shaft 39 positioned parallel to the shaft 34. The meshing gears 35 and 37 have a different gear relation to the meshing gears 36 and 38, and consequently different speeds are obtained when either set of the meshing gears are used to drive the shaft 39 from the shaft 34. To produce this speed change, the gears 37 and 38 on the shaft are rotatably mounted and are placed in driving relation with the shaft by means of a clutch 40 operated through the connecting levers 41, 42 and 43 by the lever arm 44, that is, this lever arm may be used to drive the shaft 39 through the gears 35 and 37 or through the gears 36 and 38 as desired. On the front extremity of the lower shaft 39 is mounted a bevel gear 45, which meshes with the crown gear 46 serving to rotate the eccentric sleeves and arbor mounted within the reciprocating casting of the head 8. For transmitting power to the mechanism for reciprocating the head, a narrow pinion 47 is mounted upon the shaft 39 and meshes with a larger gear 48 which is mounted on a stub shaft 49. Centrally on the stub shaft is positioned a worm 50 which rotates a worm gear 51 and meshing therewith. The worm gear is mounted upon a shaft 52 which is positioned at right angles with the shaft 49 and directly beneath it. A set of speed gears 53, 54, 55 and 56 are adapted to mesh with the idler pinion 57 which is mounted on a movable frame 58. This idler pinion meshes with a gear 59 non-rotatably and slidably mounted on the shaft 60 in which is cut the keyway 61. A key moving in the keyway 61 holds the gear 59 in non-rotative position on the shaft. The slidable movement to the gear and idler which are held in position by the frame 58 is accomplished by means of the curved arm 62 and the gear changes affected by hand wheel 63 which may be moved through the four positions shown in Fig. 2, being held in each position by notches cut in the front of the gear casing shown at 64 in Fig. 2. The power is transmitted to the shaft 60, thence to a vertical shaft 65 through the bevel gear 66 meshing with the upper and lower bevel gears 67 and 68 rotatably mounted on the vertical shaft 65. The reversal of the movement of the reciprocating head is accomplished by a mechanism mounted in connection with the bevel gears 67 and 68, the details of which will be hereinafter explained.

From the shaft 65 the power is transmitted through a shaft 69 connected by bevel gears 70 and 71 to the shaft 65. On the opposite end of the shaft 69 is mounted a worm 72 meshing with and driving a worm gear 73, which is mounted to freely rotate on the transverse stub shaft 74, upon which is also mounted a sprocket 75 which drives through a silent chain the sprocket 76 positioned directly above it and mounted on shaft 77. The shaft 77 carries also the gears 78 which mesh with the racks 7 and may be rotated by hand when the worm is released to rotate freely on its stub shaft by means of hand wheel 79. When the head is being reciprocated automatically by the motor, power is transmitted through the connections explained; the worm wheel 73 being non-rotatably fixed to its stub shaft by the mechanism shown in Fig. 10, which comprises a slidable member 80 in which is pivoted a latch 81. This latch has a tongue member which extends through an aperture 82 in the shaft and may be pushed in place to engage one of the key ways 83 in the worm wheel or may be withdrawn against the compression spring 84 when the worm wheel is allowed to rotate freely on the shaft.

Returning to the operation of the mechanism which reverses the reciprocation of the head, a vertical rod 85 is positioned so that when the cutting tool or grinding tool on the arbor reaches the bottom of the holder on the arbor, the lower end of the rod 85 which terminates in a flat plate 86 will contact the top of the work or the adjustable bracket 87 which may be positioned at any desired point in its travel. The bracket 87 is held in place on the rod 89 by the adjusting screw 90. On the rod 85 and held in place by the adjusting screw 88 is a member 91 which is fixed to the rod 85 by the adjusting screw and slides freely on a parallel shaft 92. That portion of the member 91, which slides on the shaft 92 has an extending finger 93 which is positioned directly between the ends of the latches 94 when the mechanism is in a neutral position. The latches 94 are pivoted at 95 near each end of the yoke 96. Each latch has a cut out portion 97 into which extend the fingers 98 extending from the fixed collars 99 positioned on the shaft 92. The single extension of the yoke shown at 96ª fits into a groove in the clutch lever of the clutch designated 100. This clutch member is keyed to the shaft 65 and is adapted to engage either of the bevel gears 67 or 68, causing the engaged gear to rotate therewith.

Describing briefly the operation, as the head reaches the bottom of the holder which is being bored or ground, and the rod 85 contacts the bracket 87, the member 91 which is mounted on the shaft 85 will be raised, causing the finger 93 to raise the upper latch 94 and disengage the finger 98 from the cut out portion of the latch shown at 97. When this latch has disengaged the finger extensions of the upper collar 99, it will contact the upper yoke arm, moving the clutch member to engagement with the upper bevel gear 67. This will cause a reversal of the movement transmitted through the connections previously explained, causing the head to be raised by means of the meshing gears with the racks on the frame uprights. When the head has moved upward to the top of the holder which is being bored, the clutch member 100 may be manually disengaged from the upper bevel gear 67. After resetting for the next cut, the clutch member may be moved across to engagement with the lower gear 68, causing the head to again travel downwardly. As explained, the head may be fed up and down the racks by hand by means of the cross arm 79 when the worm wheel 73 is disengaged to run free upon its stub shaft.

To counterbalance the weight of the head and to remove the weight of the head from the power source, counterweights 101 attached to cables 102 move up and down with the reciprocation of the head in the wells 103 formed by the shape of the upright frames. The cables supporting these counterweights pass over to sheaves 104 which are positioned on top of the frames and are connected to the frame of the slidable head. Within the reciprocating head are two eccentric sleeves 17 and 18. The inner eccentric sleeve may be rotated relative to the outer sleeve by means of a worm ring 105 meshing with the worm 106 and a micrometric adjustment made between the two eccentric sleeves by the adjustable dial 107, cooperating with a metallic designating finger 108. The circumference of the dial is graduated so that when a certain graduation registers with a line on the end of the finger, the relative setting of the two eccentrics is such that the arbor and its cutting or grinding apparatus will be rotated about the hole which is being bored and simultaneously with this circular travel, the grinding wheel will rotate on the axis of the shaft 14. If a cutting wheel is being used, the tool will make an accurate cut on the wall of the cylinder or hole being bored, the depth of the cut being accurately regulated to a one thousandth of an inch setting made by the graduated dial. The extreme setting is made by positioning the eccentrics so that their thick walls coincide as shown in Fig. 5. The central shaft 14 may be accurately centered in the head by rotating the eccentrics so that the thick wall of one is adjacent the thin wall of the other.

Figure 1:
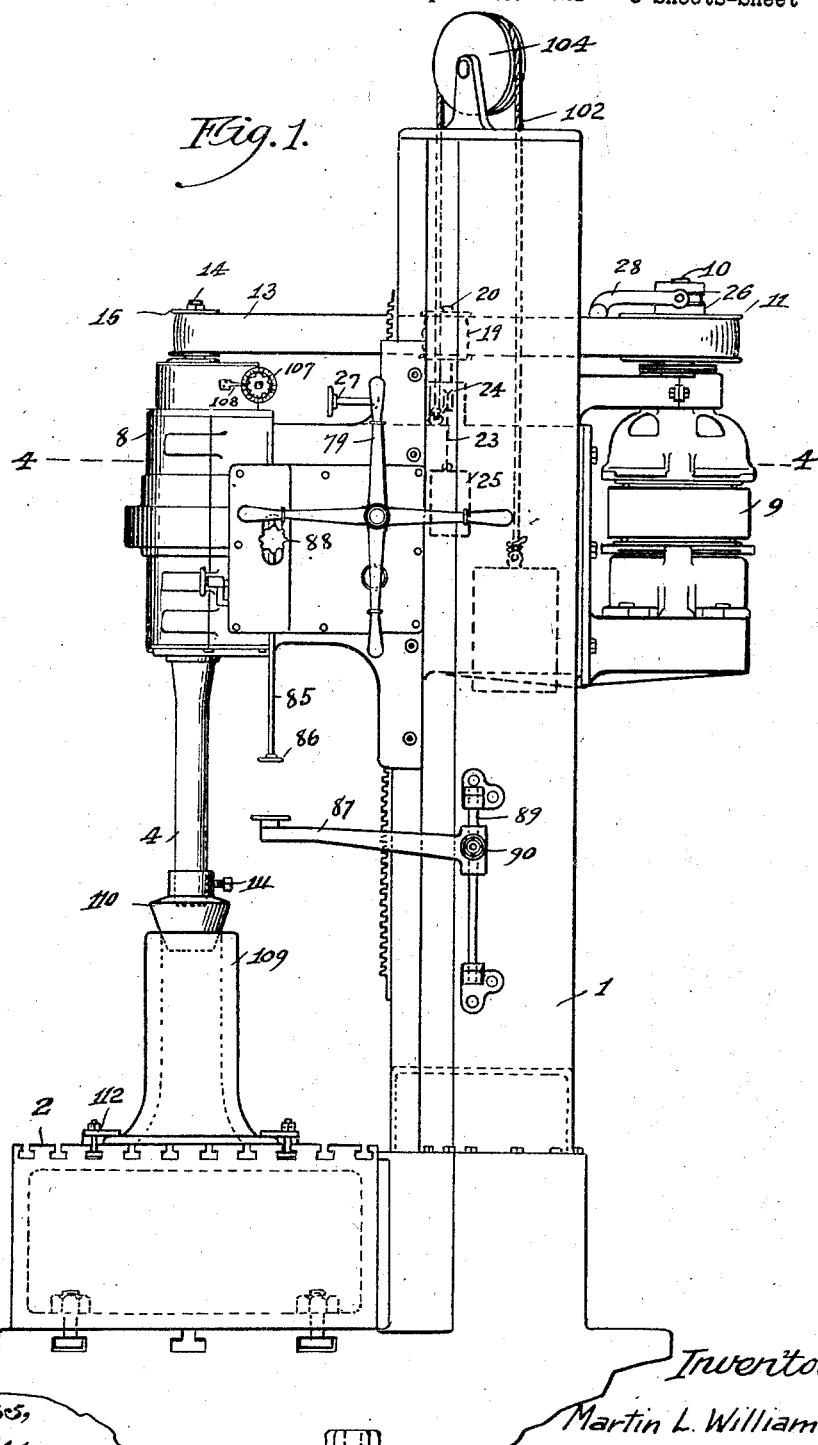
Fig. 1 is a side elevational view of the machine.

Describing briefly the method of setting up the work on the table and making the initial setting of the arbor in grinding or in cutting, on the table is set the work which is shown in Fig. 1 as an internal combustion engine cylinder block 109. The grinding wheel 3 is removed during this initial setting and the cone 110 is held in place on the arbor by means of the set screw 111. The head is then lowered so that the cone which has a machine feed with the arbor extends into the top of the hole to be bored as shown in Fig. 1. The cylinder block is then fastened to the jacket by means of the toe plates 112 bolted to the table. The head is raised and the cone removed and the grinding wheel placed on the arbor which is slightly smaller in diameter than the hole to be bored. The grinder is then moved by means of the adjustment of the two eccentrics in the head to contact the cylinder to be bored. The bracket 87 is then fixed in place so as to contact the vertical rod 85 when the grinding wheel reaches the bottom of the cylinder and the automatic transmission of power to operate the reciprocating head is set in motion. After each reciprocation of the head, the grinding wheel may be set over one one-thousandth or two thousandths of an inch more by the graduation of the dial and the cylinder bored the desired amount.

It is understood, of course, that a cutting tool may be used instead of the grinding tool where the cylinder has been scored or marred sufficiently to require the use of a cutting tool. A travelling table may be used in place of the fixed table here shown where cylinder blocks of the same type are to be machined or ground. In such case, it is necessary to set the arbor to a grinding position in the cylinder and the subsequent cylinders will follow in proper position.

It should be noted that the two uprights on which the ways 7 are mounted are connected by permanent webs 5. This construction prevents the spreading or displacement of the uprights which would hinder the freedom of travel of the reciprocating head. Another feature is the fact that all of the operating parts, including the motor, are mounted upon the reciprocating head and operate with it. The machine described permits the accurate boring and grinding of engine cylinders and is practically automatic in its operation. After being set, it is only necessary to adjust the change in the cut which is to be made by the cutting tool or grinding wheel as the machine otherwise operates automatically.

I claim as my invention:

1. In a combined boring and grinding tool, the combination with a frame, of a reciprocating head adapted to slide vertically on the frame, a driving means mounted on the head automatically functioning the reciprocation, two eccentric sleeves carrying a tool arbor and a separate vertical grinding shaft positioned internally thereof, means for separately driving the grinding shaft and tool arbor, and means for manually selecting speeds for varying the speed of the tool arbor.

2. In a combined boring and grinding tool, the combination with a frame, of a reciprocating head adapted to slide vertically upon the frame, a driving means mounted on the head, reciprocating driving mechanism comprising variable speed gears, a selector and clutch mechanism driven from the driving means and adapted to automatically reciprocate the head at the manually selected speeds, two eccentric sleeves carrying a tool arbor mounted in the head, a grinding shaft carrying a grinding wheel driven separately from the sleeves, and means for automatically reversing the reciprocation of the head when the tool or grinding wheel has reached the bottom of the cut.

3. In a combined boring and grinding tool, the combination with a frame, of a reciprocating head adapted to slide vertically on the frame, a motor driving means mounted on the head automatically functioning the reciprocation thereof, two telescoping eccentric sleeves rotatably mounted in the head and carrying a tool arbor, a grinding spindle separately driven through connections from the motor driving means, means for rotating the sleeves in different positions relative each other to regulate the extent of the cut made by the cutting tool and grinding wheel, means for regulating the speed of travel of the tool, and separate means for regulating the speed of reciprocation of the head.

4. In an apparatus of the character described, the combination with a frame, of a vertically reciprocating head carried thereby, a sleeve journaled for rotation in said head, a tool carrying arbor mounted for eccentric rotation with respect to said sleeve, means to vary the eccentricity of said arbor with respect to said sleeve, a pair of longitudinally slidable shafts carried by said head, means to rotate said shafts, driving means carried by one of said shafts and connected with said sleeve, and driving means carried by the other of said shafts and connected with said arbor.

5. In an apparatus of the character described, the combination with a frame, of a head mounted for vertical reciprocation on said frame, a pair of eccentrically mounted rotatable members carried by said head, a rack carried by said frame, a shaft carried by said head and provided at one end with a pinion for engaging said rack and at the other end with a worm wheel and handle, a second shaft arranged at an angle to said first shaft, a worm on said second shaft adapted to engage the worm wheel, manually operable means and power driven means on said second shaft, and means operable to disengage said worm and wheel whereby said spindle may be directly actuated by said handle.

6. The combination set forth in claim 5 in which the head is reciprocated by power driving means including automatically reversing mechanism and means to adjust and regulate the operation of said reversing mechanism.

7. In a combined boring and grinding tool, the combination with a frame, of a reciprocating head adapted to slide vertically on the frame, a motor driving means mounted on the head functioning the reciprocation thereof, telescoping eccentric sleeves mounted in the head and carrying a tool arbor, a grinding spindle separately driven through connections from the motor driving means, means for rotating the sleeves to different positions relative each other to regulate the extent of the cut, means for regulating the speed of the tool, and means for automatically raising the head when the cut has reached a predetermined point.

MARTIN L. WILLIAMS.